United States Patent [19]

Schulze

[11] Patent Number: 4,918,730

[45] Date of Patent: Apr. 17, 1990

[54] PROCESS AND CIRCUIT ARRANGEMENT FOR THE AUTOMATIC RECOGNITION OF SIGNAL SEQUENCES

[75] Inventor: Klaus Schulze, Nusse, Fed. Rep. of Germany

[73] Assignee: Media Control-Musik-Medien-Analysen Gesellschaft mit Beschrankter Haftung, Waldshut-Tiengen, Fed. Rep. of Germany

[21] Appl. No.: 210,932

[22] Filed: Jun. 24, 1988

[30] Foreign Application Priority Data

Jun. 24, 1987 [DE] Fed. Rep. of Germany ....... 3720882

[51] Int. Cl.[4] .............................. G10L 5/00; G06J 1/00
[52] U.S. Cl. ...................................... 381/43; 364/604; 358/84; 455/2
[58] Field of Search ................................... 381/41–43; 364/604; 358/84; 455/2

[56] References Cited

U.S. PATENT DOCUMENTS

| | | | |
|---|---|---|---|
| 3,919,479 | 11/1975 | Moon | 381/42 |
| 3,989,896 | 11/1976 | Reitbock | 381/42 |
| 4,450,531 | 5/1984 | Kenyon et al. | 381/42 |
| 4,542,525 | 9/1985 | Hapf | 381/46 |

Primary Examiner—Emmanuel S. Kemeny
Attorney, Agent, or Firm—Cushman, Darby & Cushman

[57] ABSTRACT

An arrangement for automatically recognizing signal sequences such as speech and/or music signals, particularly useful for statistical evaluation of the frequency of play of music titles, commercial advertising spots, or verbal materials, etc. One envelope signal is generated from each preset signal sequence (e.g., music title) and time segments of the envelope signals are stored. An envelope signal is also generated from a signal sequence that is to be examined. Time segments of the envelope signal of the signal sequence to be examined are continually compared with the stored segments of the envelope signals of the preset signal sequences. When a preset degree of concordance is exceeded, a recognition signal is generated.

20 Claims, 15 Drawing Sheets

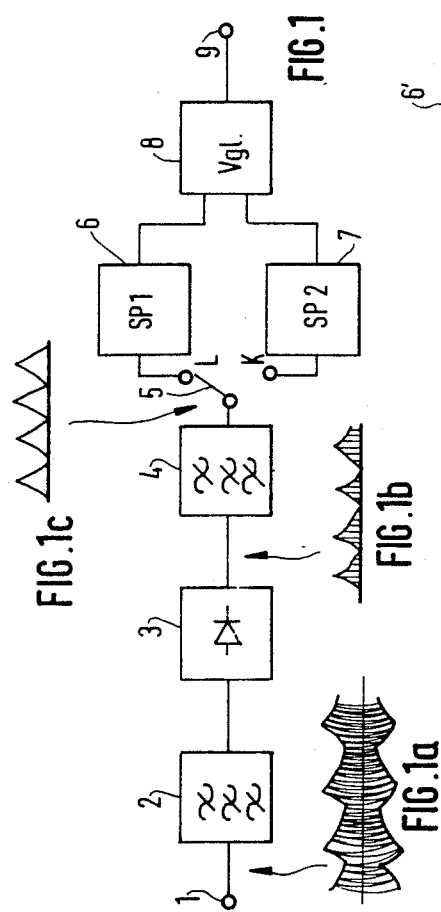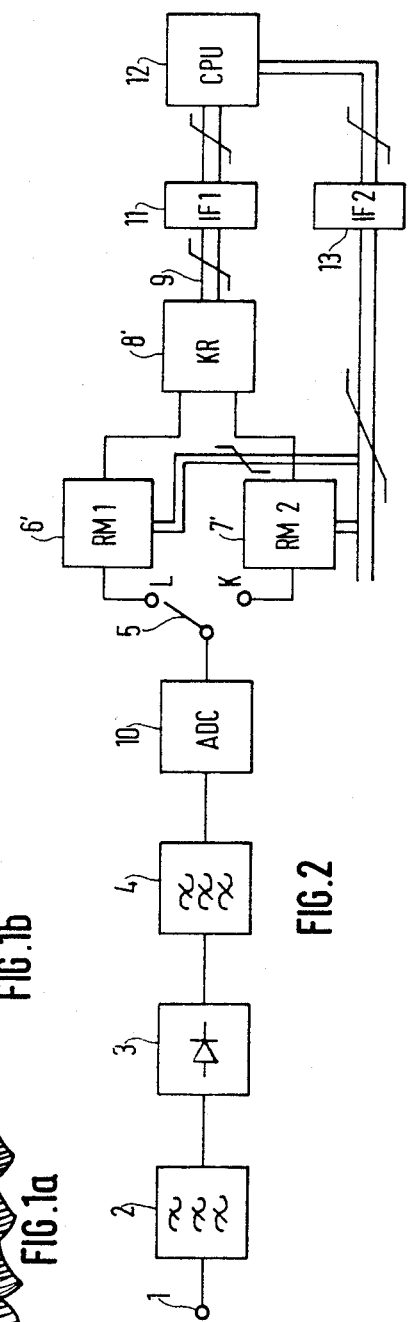

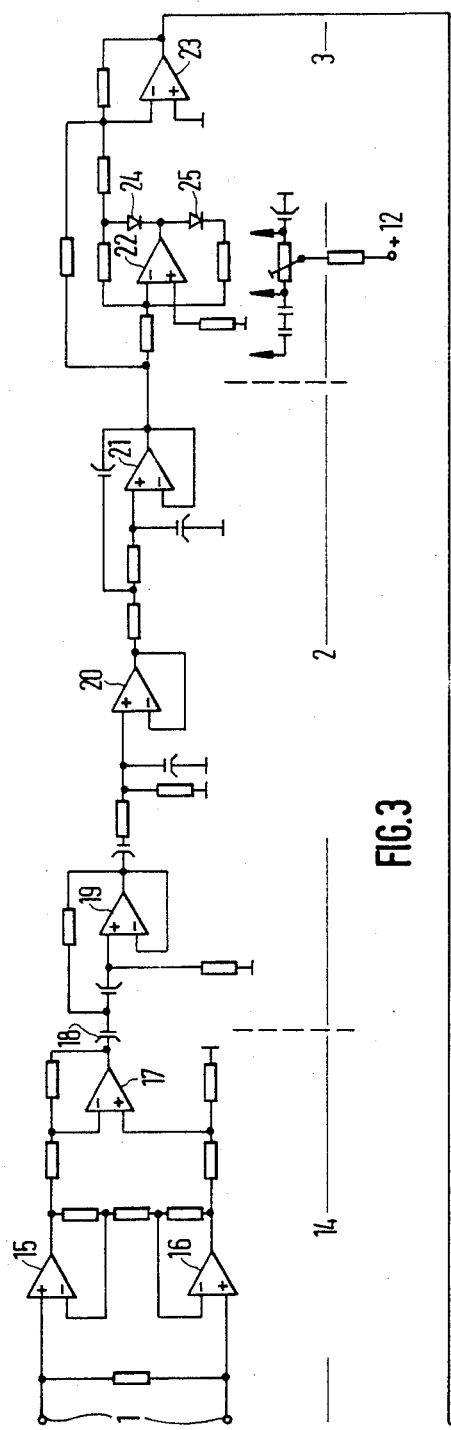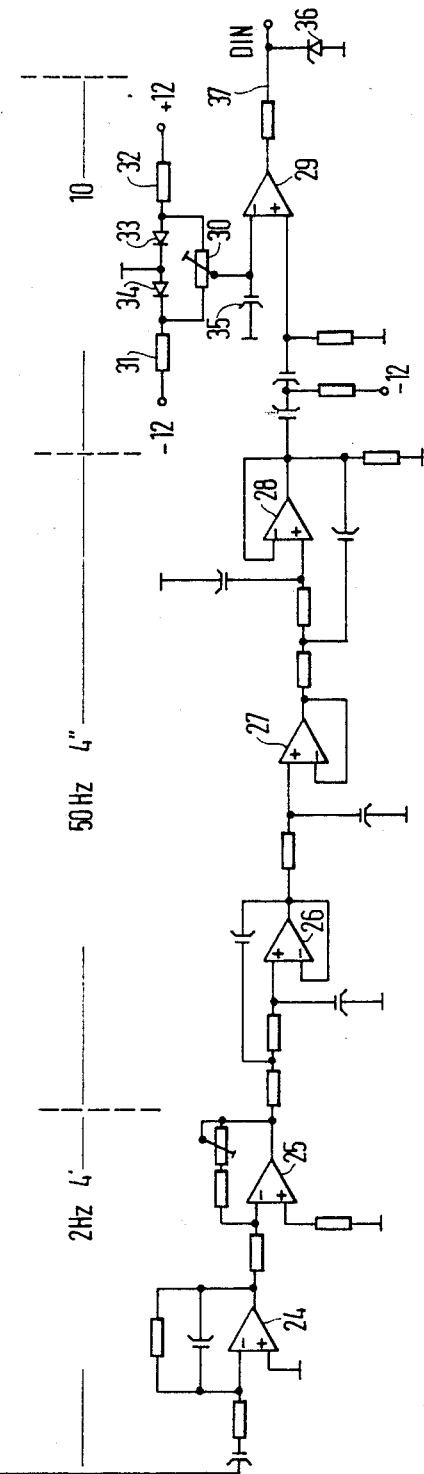
FIG.3

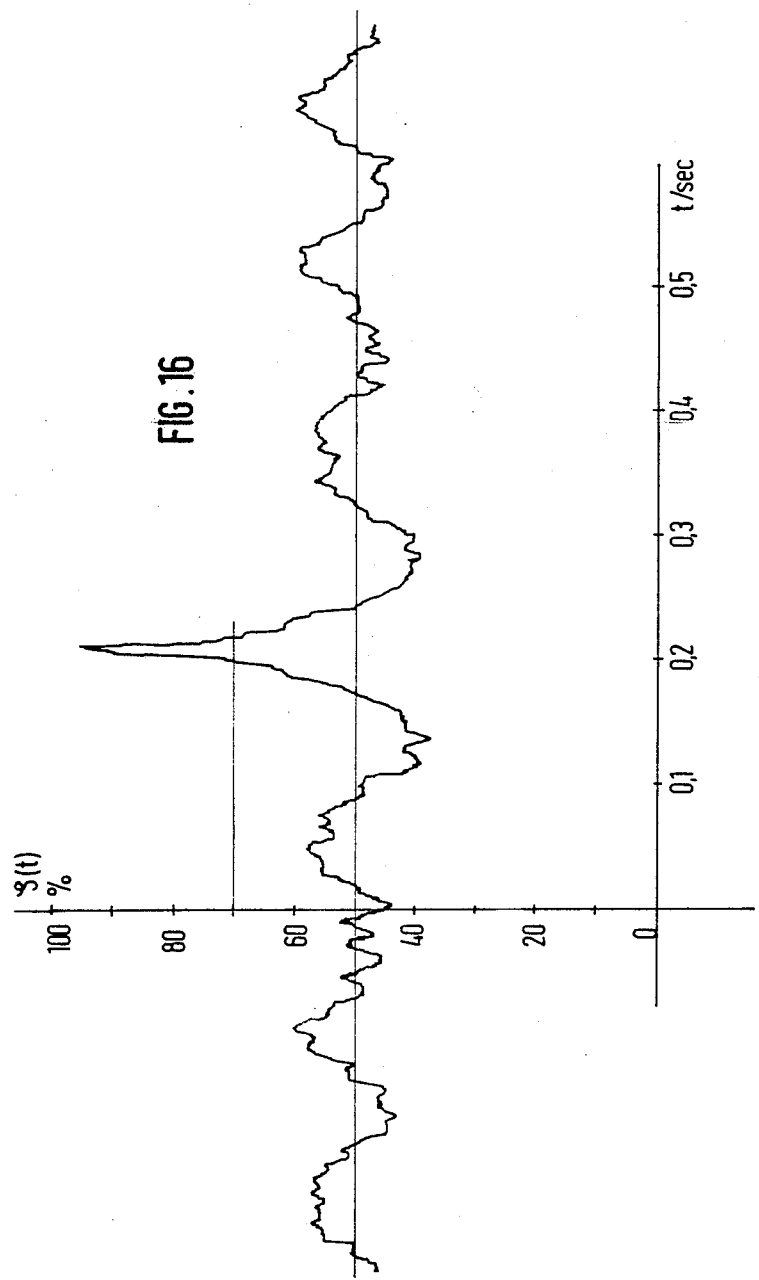

PROCESS AND CIRCUIT ARRANGEMENT FOR THE AUTOMATIC RECOGNITION OF SIGNAL SEQUENCES

BACKGROUND OF THE INVENTION

1. Field of the Invention

The invention relates to a process and a circuit arrangement for the automatic recognition of signal sequences such as speech and/or music signals, in particular for the statistical evaluation of the frequency of play of music titles, commercial advertising spots, or verbal materials.

2. Description of the Prior Art

For various purposes, such as keeping track of royalties for creators of music works, monitoring whether certain commercial advertising spots are being played by radio stations, etc., it is necessary to determine whether certain signal sequences coincide with each other.

Heretofore, this work has been accomplished by having a large number of persons listen continuously to various radio stations to determine whether certain music titles, commercial advertising spots, verbal materials, etc. are played. This method results in high personnel costs and it is not sufficiently reliable due to human error, inattentiveness, etc.

Therefore, the primary object of the present invention is to automate this process by providing a method of and a circuit arrangement for the automatic recognition of signal sequences. The word "recognition" as used herein relates to unique entities. Thus, the objective is only to recognize whether an individual, unique piece of music is present or not. It is not an object of the invention to determine to degree of similarity between two signal sequences as is the case with automatic speech recognition. In automatic speech recognition (cf. West German OS No. 23 47 738), the object is to obtain a semantically oriented set of characteristics that can be used to recognize that the same words are identical when spoken differently and, if possible, even when spoken by different persons. According to the present invention, however, even minor differences in signals, even though semantically identical or at least quite similar, should cause rejection as an "unfamiliar" signal.

SUMMARY OF THE INVENTION

The underlying principle of the invention is to compare the envelopes of signals that are being evaluated, rather than comparing all portions of he signals. This results in a significant reduction of data vis-a vis comparing all portions of the signals. To further minimize the amount of data that must be processed, only small time segments of the signals being evaluated are compared, for example, of 1.7 seconds length. A 1.7 second time segment has proven experimentally to provide an unambiguous identification of music titles, verbal materials, commercial advertising spots, etc. with a high degree of reliability. It has also been found that unambiguous identification is even possible when the correlation between the signal sequences which are to be compared is only approximately 85 to 95%.

Further reduction in the amount of data that must be processed is achieved by limiting the envelope signals to a narrow, low-frequency range using a bandpass filter. For example, if the signal sequences to be examined lie in the frequency range from 0 to 15 KHz., the desired reliable recognition may be achieved even if the envelope signals are limited to a frequency range of approximately 2–50 Hz.

The reliability of recognition can be enhanced by differentiating the envelope signal. Examining the differentiated envelope signal, in particular eliminates erroneous recognition of very rhythmic music. Differentiation can be carried out over the entire spectral range of the envelope if desired. However, as an alternative, differentiation can be limited to portions of the envelope spectrum.

Further data reduction and a functional improvement are obtained by using level normalization. The frequency-limited envelope signals have an amplitude which varies in proportion to the amplitude of the original signal sequence, hence is approximately proportional to the volume. If one wishes to use this envelope signal for the recognition of the signals that are to be examined, high demands would have to be placed on the level accuracy of the transmission path, which cannot always be met, even for technical reasons alone. In addition, due to reasons of taste, the levels of identical program offerings are triggered differently. The envelope signals to be compared are normalized to a standard level before being compared. This can be carried out by using an automatic gain control amplifier.

In accordance with one advantageous alternative embodiment, only the sign of the envelope signals is evaluated. This evaluation is carried out by using a comparator whose reference voltage (in the mV range) is adjusted to close to zero. This virtually produces the sign function of the envelope signals and thereby a digitization of the analog signals. Thus, normalization can be carried out quite easily in terms of circuitry required.

In actual practice there are additional level variations up to ±10 dB. Furthermore, as already mentioned, this results in a further reduction of data. As an alternative, the actual comparison can be carried out with digital components, which is also, quite simple these days in view of the state of the art in digital electronics.

Further data reduction is achieved by band limiting signal sequences prior to the formation of envelopes to a narrow range (e.g., from 200 Hz to 4 kHz). This frequency limiting mainly serves to account for possible delay distortions occurring on the transmission paths, although this frequency limiting is not essential to the primary object of the invention.

Also, in accordance with the principles of the invention, a signal sequence which is to be examined can be compared with several stored signal sequences (e.g., music titles), nearly in real time. Here, a segment of the unknown signal sequence which is to be examined is compared with all stored signal sequences within a short time between the arrival of two consecutive bits of the unknown signal sequence.

This may be accomplished by sending the sign-coded envelope signals to the comparison at a relatively low scanning rate (approximately 300 Hz), while the comparison is carried out at a much higher frequency. The clock frequency of the comparison corresponds to the product of the scanning rate times the number of preset signal sequences times the number of bits stored per preset signal sequence. Therefore, if storage is undertaken as set forth in claim 7, e.g., 512 bits per preset signal sequence, a scanning rate of 300 Hz is used, and 8 titles which are to be monitored are stored, then the clock frequency of the comparison is 300×8×512=1.2288 MHz. In order for the comparison to function properly, this product must be increased by one so that the corresponding counters can be reset or the registers advanced one step within this one clock pulse.

The invention has two different modes of operation, namely learning and comparing or correlating. In the "learning" phase, the known titles which are to be monitored are stored by taking signal samples or so-called masks and sampling their band-limited sign-coded envelope signal at a sampling rate of approximately 300 Hz and storing as an approximately 1.7 second long mask (with a 512-bit mask length). In the correlating mode, a signal source such as the output from a radio receiver is then processed in the same manner (band-limited, sign-coded envelope signal) and is examined with respect to the stored mask by means of digital correlation.

BRIEF DESCRIPTION OF THE DRAWINGS

The invention will now be described more fully hereinbelow with reference to the embodiments in conjunction with the accompanying drawings, in which:

FIG. 1·is a block diagram of a circuit arrangement according to a first embodiment of the invention;

FIG. 2 is a block diagram of a circuit diagram according to a second embodiment of the invention;

FIG. 3 is a detailed schematic circuit diagram of the signal processing section of the circuit arrangement according to the second embodiment of the invention.

FIGS. 5–16 are various diagrams of envelope signals which explain the principles of operation of the invention.

DETAILED DESCRIPTION OF THE PREFERRED EMBODIMENTS

Figure 10:
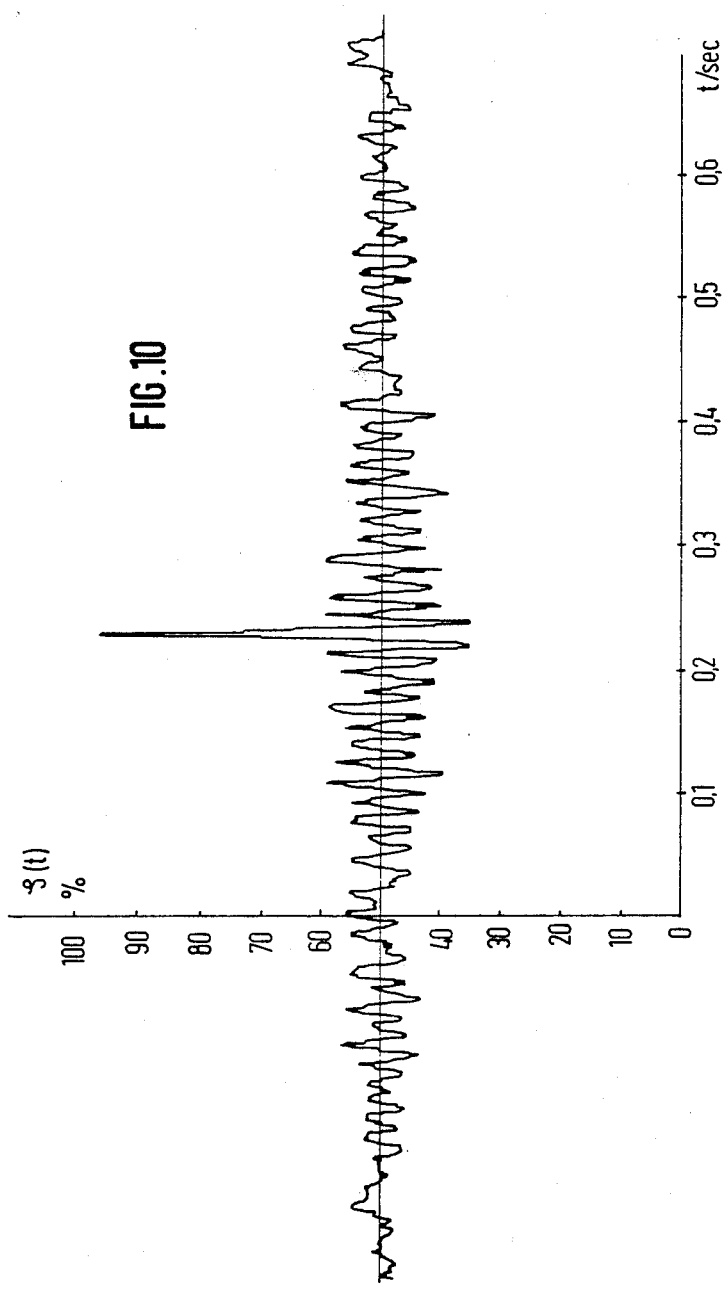

In the circuit arrangement shown in FIG. 1, signal sequences which, for example, have the pattern depicted in (a) of FIG. 1, are coupled to an input 1 and from there to a bandpass filter 2, which limits the input signals to a frequency range between 200 Hz and 4 kHz. Bandpass filter 2 essentially serves to even out delay distortions occurring on the transmission path. In theory, this filter could also be eliminated. Instead, a low-pass filter having a cutoff frequency of approximately 4 kHz could be used. A rectified envelope signal is produced in a downstream rectifier circuit 3 as shown, for example, by (b) in FIG. 1. This envelope signal is then coupled to a second bandpass filter 4, which has a bandpass of from approximately 2 Hz to 50 Hz. The output signal from the second bandpass is then the band-limited envelope signal. An example of such a signal is shown in FIG. 10. In another modification of the invention not shown in the drawing, the output signal from the second bandpass can also be routed through a differentiator, where the time derivative (d/dt) is formed. The output of the second bandpass is connected to a change-over switch 5, which, in the "learning" (L) mode is connected to a first memory 6, whose output is connected to a terminal of a comparator 8. In the "learning" mode, a time sector of the band-limited envelope signal having a length of approximately 1.7 seconds is read into the memory 6.

In the "compare" or "correlate" (C) mode, the change-over switch 5 is in its other position, so that the band-limited envelope signals can be coupled from the output of the second bandpass filter 4 to a second memory 7, whose output is connected to the other terminal of comparator 8. Comparator 8 then carries out a continuous operation between the signals arriving at memory 7 and the signals stored in memory 6 and, if there is concordance, sends a coincidence signal to its output 9.

In the embodiment shown in FIG. 2, the band-limited envelope signals from the second bandpass filter 4 are sent to an analog/digital converter 10 and they are converted thereat into digital signals. These digitized, band-limited envelope signals are then coupled in a similar manner via the change-over switch 5 in the "learning" mode to a first RAM memory 6' or in the "correlate" mode to a second RAM memory 7'. The outputs of the two RAM memories 6' and 7' are then sent to a correlation circuit 8' to whose output again a recognition signal is applied. This recognition signal is routed to a central data processor 12 through a data bus and an interface circuit 11. The central data processor 12 controls the addressing of the two RAM memories 6' and 7' through another data bus and a second interface circuit 13. The central processor 12 can output in coded form to a printer or some other storage medium the time of arrival of a recognition signal as well as a signal that identifies the recognized mask via output devices not shown in detail.

The analog/digital converter 10 of FIGS. 1 may be a converter that operates with several bits. It may also be a converter which operates with one bit and which then in principle forms only the sign of its input signals and hence, in the final analysis, the sign function of the band-limited envelope signals.

Figure 4:
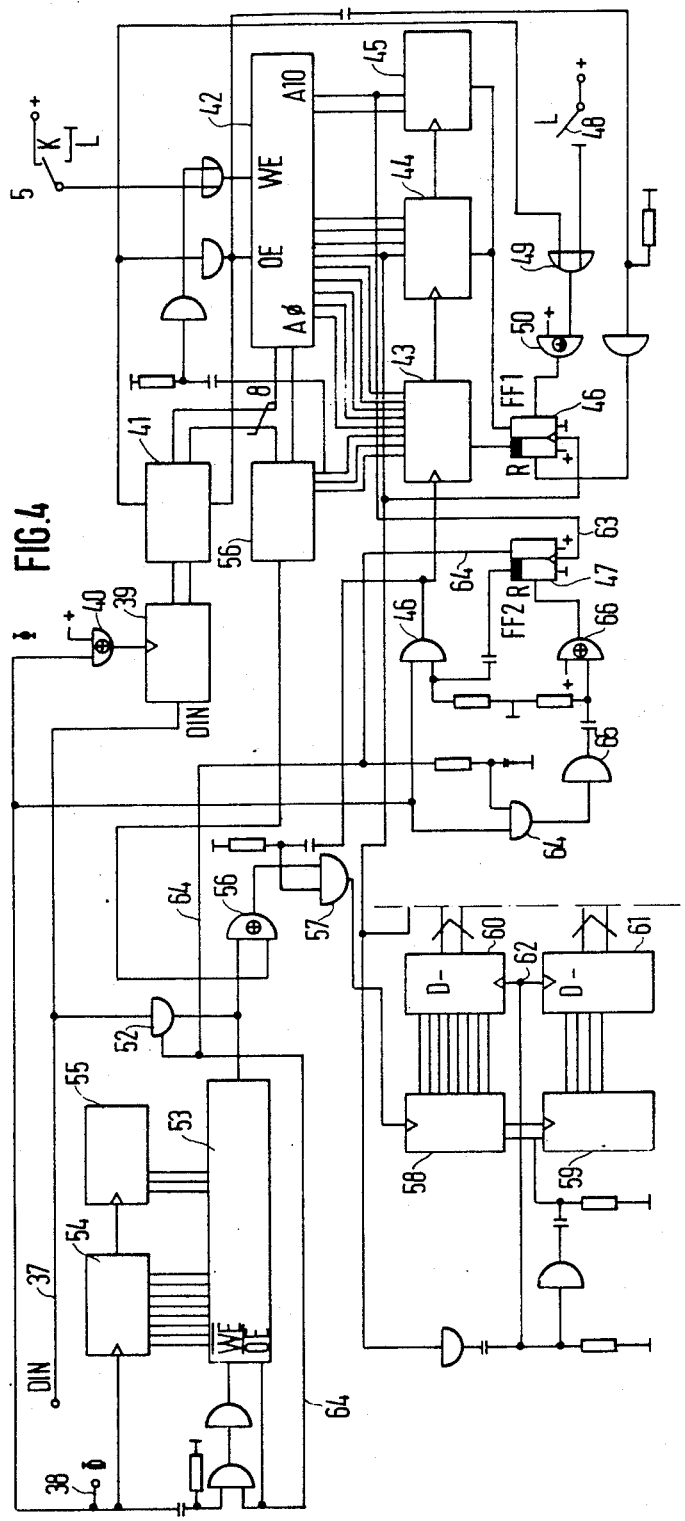
FIG. 4 is a detailed schematic circuit diagram of the digital comparator section of the circuit arrangement of the invention.

FIGS. 3 and 4 show a specific embodiment of the circuit arrangement of FIG. 2. The input signals are first coupled from input 1 to a symmetrical input amplifier 14, which in this case consists of three feedback operational amplifiers 15, 16 and 17. The output signals from this input amplifier are coupled through a decoupling capacitor 18 to the bandpass filter 3, which in the manner shown consists of three feedback operational amplifiers 19, 20 and 21, and various external wiring connections including resistors and capacitors.

Rectifier 3 is constructed as a two-way rectifier made up of two feedback operational amplifiers 22 and 23 and diodes 24 and 25 located in the feedback path of the forward operational amplifier 22, as well as external wiring consisting of resistors.

The downstream bandpass filter 4 consists of a series connection of a high-pass filter 4' having a cutoff frequency of 2 Hz. with a low-pass filter 4" having a cutoff frequency of 50 Hz. The high-pass and low-pass filters 4' and 4" include operational amplifiers 24 through 28 and their various external connections. Here, the downstream analog/digital converter is designed as a comparator 29 to whose positive input (+) the output signals from low-pass filter 4" are coupled and to whose reference input (−) a reference voltage of a few mV is coupled from a voltage divider 30, which is connected to a negative supply voltage via a resistor 31 or to a positive supply voltage via a resistor 32. A series connection of two diodes 33 and 34 are connected in parallel to resistor 30. These diodes are switched from positive to negative supply voltage in the forward direction and their common connection point is at ground potential. This circuit produces a highly stable reference voltage on the order of several mV. To further suppress interference, the reference input of comparator 29 is also connected to ground via a capacitor 35. The output of comparator 29 is limited to the TTL level by means of a Zener diode. Since the reference or threshold value of comparator 29 is nearly 0 V, it operates as a sign detector for positive signs and thus forms the sign function of its input signals. Since comparator 29 only has two output levels (on or off), its output signals can be viewed as digital signals. These output signals $D_{IN}$ are then routed to the digital portion of FIG. 4, which will now be described. In this description, we shall assume that 32 masks of 512 bits each can be processed. It goes without saying that other numbers of masks and other mask lengths may be used.

The band-limited, sign-coded envelope signals $D_{IN}$ coming from the output of comparator 29 on line 37 are first written into an 8-bit shift register 39 with clock signals of, for example, 300 Hz, which arrive from a clock generator (not shown) on a line 38 and this shift register is controlled by the clock pulse Φ (line 32) in combination with a gate 40. From the shift register, the signals $D_{IN}$ proceed bit by bit (8-bit length) via a bus driver 41 to a memory 42, which is here designed as a 2K x 8 bit RAM memory. A counting chain with the series-connected counters 43, 44 and 45 receives via an AND-gate 46 the clock signal Φ and determines via its outputs the addresses of memory 42, among which the signals from the bus driver 41 are stored. To do this, the clock pulse Φ in counter 43 is first divided by 8 and is applied as a byte address to the address lines A0 through A10 of memory 42.

The I/O transition of certain address lines controls two JK flip-flops 46 and 47 which are triggered with leading edges and carry out important control functions. With a mask length of 512 bits, the first flip-flop 46 is triggered for an I/O transition of the address line 45 after a mask has been fully stored. This flip-flop is set at the start of the "learning" phase by means of a button 48 ("Start Learn") and two gates 49 and 50 (output Q=1; $\overline{Q}$32 0) and it then toggles back for the I/O transition of address line A5, clearing counters 43, 44 and 45. Additional masks can then be loaded by setting the two counters 44 and 45 to a start address via lines not shown herein. After 512 more clock pulses, the process is once again stopped by flip-flop 46. Line 51, which is identified as "mask end" and which is connected to address line A5, signals the end of the process of writing a mask into a central processor not shown, thereby interrupting the clock pulse Φ.

Once all the masks have been read into memory 42, changeover switch 5 is switched into the "C" (for correlation) position. At the same time, the clock pulse Φ is increased: for 32 masks with a length of 512 bits and with a scanning frequency of 300 Hz, the clock pulse is increased to $300 \times 512 \times 32 + 1 = 4.915201$ MHz.

Thereupon, the signals which are to be evaluated and which issue from the analog portion of FIG. 3 are read into a memory 53 via a gate circuit 25 described more fully hereinbelow, again at a clock rate of 300 Hz.

During the comparison process, all 32 masks of memory 42 are compared consecutively with the 512 bits of memory 53 by reading out these counters with the correct addresses to counting chains (43, 44, 45 associated with memory 42; counters 54 and 55 associated with memory 53). Only "one channel" of counter 43 is in use. It contains the last 512 bits of the $D_{IN}$ signal resident in line 37. Memory 42 sends its data via a multiplexer 56, which carries out a parallel-serial conversion, to one input of the comparator, which is here designed as an exclusive-OR gate 56. The output signals from memory 1 are sent to the other input of this exclusive-OR gate 56. If there is concordance between its input signals (in other words, 0 and 0 or 1 and 1), a "1" will appear at the output of exclusive-OR gate 56. This "1" is routed via a gate 57 to a counting chain made up of two 4-bit counters 58 and 59. Thus, each concordance between the signals from the two memories 42 and 53 increases by 1 the counter reading in counting chain 58, 59.

After comparing each mask (512 bits), the counter reading of counters 58, 59 is passed to D-registers 60, 61 by means of the trigger signal (address line A5) for flip-flop 46 ("mask end" line) and counters 58 and 59 are then cleared. The D-registers (60, 61) pass their data on to a processor (not shown), which is also controlled by the signal on "mask end" line (line 67).

If there is complete concordance between the mask and the data being analyzed, the counter reading in counters 58, 59 can be 512. Since a scanning error is almost always present, the counter reading is generally lower. Actual practice has shown that with good signal processing, about 95% of the maximum counter reading (i.e., a count of 486) is achieved when the two signals coincide (a count of 256 is the expected value for signals that do not correlate). If all the masks in memory 42 are compared with the 512 bits currently stored in memory 53, this is recognized at one of the outputs of counter 44 or 45, depending on the number of masks and this is communicated via line 63 to flip-flop 47, which switches over, thereby assuring the suppression of a clock pulse for counting chain 43, 44, 45, while counting chain 54, 55 of memory 53 shifts and, by means of a clock pulse on line 64 (output of flip-flop 47) opens gate 52 for one clock pulse and thus writes a scanned value of signal D.. on line 37 into memory 53. In the process, counting chain 54, 55 advances one clock pulse so that there arises between the addresses of the two memories a difference that increases by one every 3.33 ms. This means that with respect to memory 53, memory 42 is organized like a shift register which, after a sweep or comparison of the 32 masks in memory, advances one step.

As soon as the signal indicating a full cycle-through of all masks disappears on line 63, flip-flop 47 is again reset by the next clock signal, Φ which reaches the flip-flop's reset input R via gates 64, 65, and 66. This clears gate 46, which permits the clock pulses to proceed to counter chain 43, 44, 45.

In short, within approximately 3.33 ms (at a sampling rate of 300 Hz. all (32) masks of 512 bits each are compared. Here flip-flop 46 monitors the individual masks (512 bits), while flip-flop 47 monitors the total number of all (32) masks. Depending on the number of masks stored in memory 42, the input (line 63) of flip-flop 47 is connected to a different output of counter chain 44, 45.

In the descriptive example of an embodiment, the comparison is performed serially by an exclusive OR gate 56. Since the clock frequency for the comparison increases with the number of masks, the number of masks is limited by the maximum working frequency of the digital components. Thus, in theory it is also possible to use a plurality of comparators working in parallel, the comparison being one byte at a time (8 bits). In the alternative, all 512 bits may be compared in parallel using 512 parallel EX-OR gates. Using the parallel technique is quite expensive, since memories having 512 outputs are required.

In theory, the operation can also be performed using a plurality of channels such that two or more stations are monitored. To do this, one could either increase the size of memory 53 and organize it in such a way that two different input signals [DIN] are read in parallel or time-multiplexed and compared or that, instead of having one memory 53, a separate corresponding memory could be provided for each channel.

Since in the recognition of musical titles, etc. it is not only important to know whether one of the musical titles which is being monitored (32) was played but also which of them is being played, the count in counter chain 43, 44, 45 can be read simultaneously with the correlation results of counter chain 58, 59, and it can then be input to the central processing unit (not shown). This makes it possible to identify the currently recognized mask.

With regard to memories 42 and 53, the inputs marked $\overline{WE0}$ and $\overline{OE}$ respectively are control inputs whereby the input $\overline{WE0}$ is a negative logic write-enable input, which controls writing to the memory, while the input OE is a negative logic output-enable input which controls the readout of data from the memory. With respect to memory 53, the gate located ahead of these inputs is used in conjunction with the clock frequency Φ and the signal on line 64 to assure that memory 53 is only read out or written to at the proper time. Respectively, for memory 42 this same function is performed by the position of switch 5 and the signal from counter 43, which identifies the transmission of a byte (8 bits) from memory 42. The remaining gates and/or their external wiring, which are shown in the diagram but are not expressly mentioned, also serve to assure proper functioning of the process control system, whereby their function is immediately clear to one skilled in the art or it establishes itself automatically when the represented circuit is built.

The following explanations relate further embodiments of the invention which can be used to achieve improved signal processing in the analog section of the audio signal correlator (ASC).

The improvement relates to a differentiation of the envelope signal, which allows more unambiguous recognition with music. Hybrid versions are also conceivable, in which the signal is differentiated only in portions of the envelope spectrum. Although to date no recognition errors have been detected (with known restrictions) even without this improvement, occasionally the multiple recognition of highly rhythmic pop titles has occurred. This can be corrected with software.

Conventionally, time-related variations in audio signals are viewed as the modulation of a multispectral carrier o(t) This varying signal then is represented as the envelope of the audio signal. It can be recovered by simple envelope rectification. This envelope signal is limited to the spectral range from 0 Hz to 50 Hz.

Figure 5:
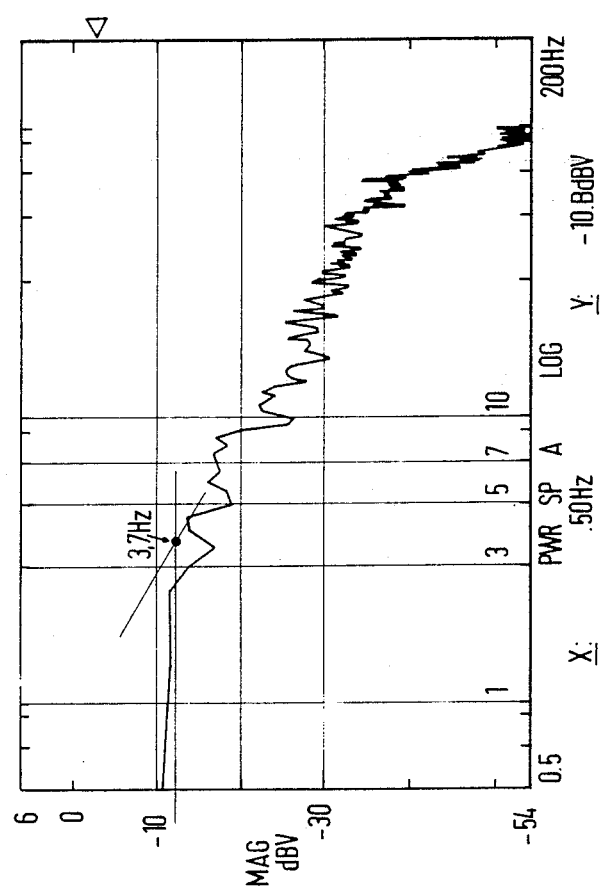
Figure 6:
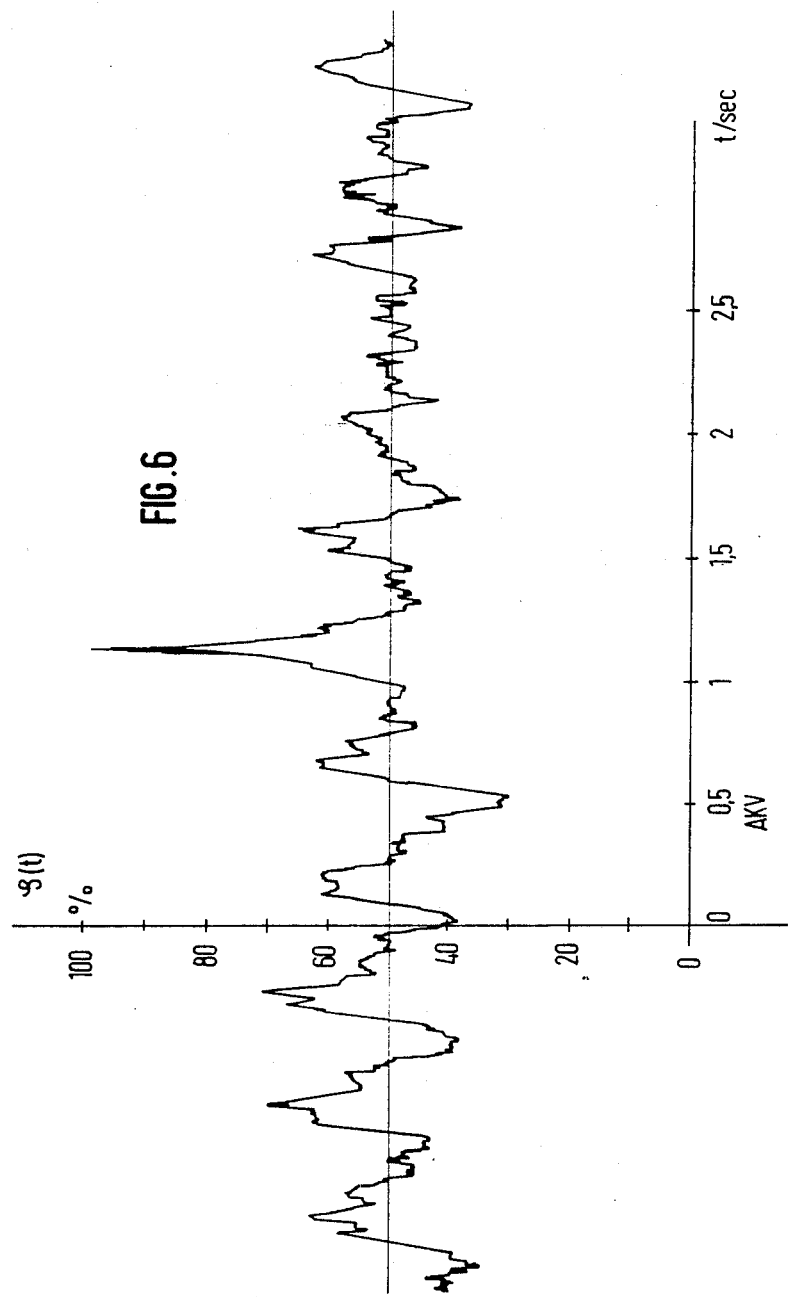
Figure 7:
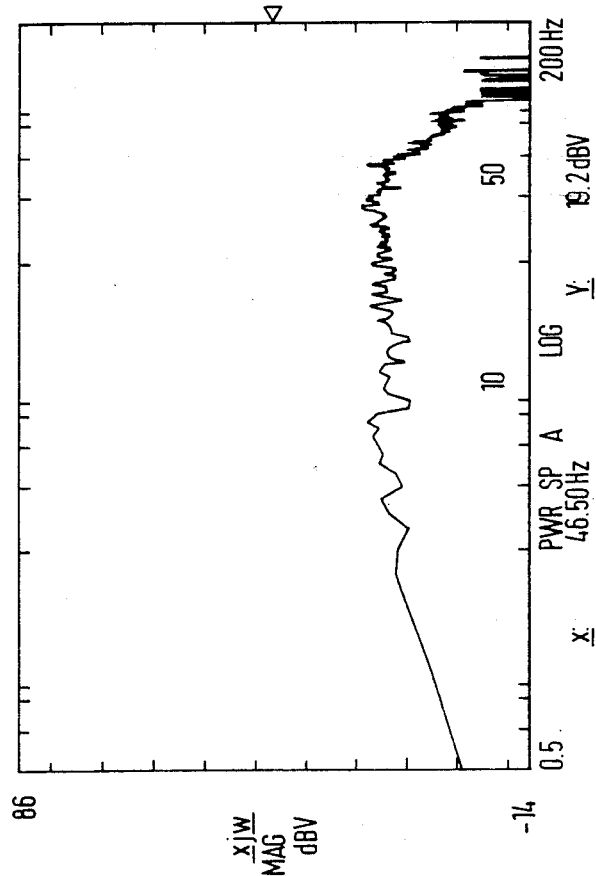
Figure 8:
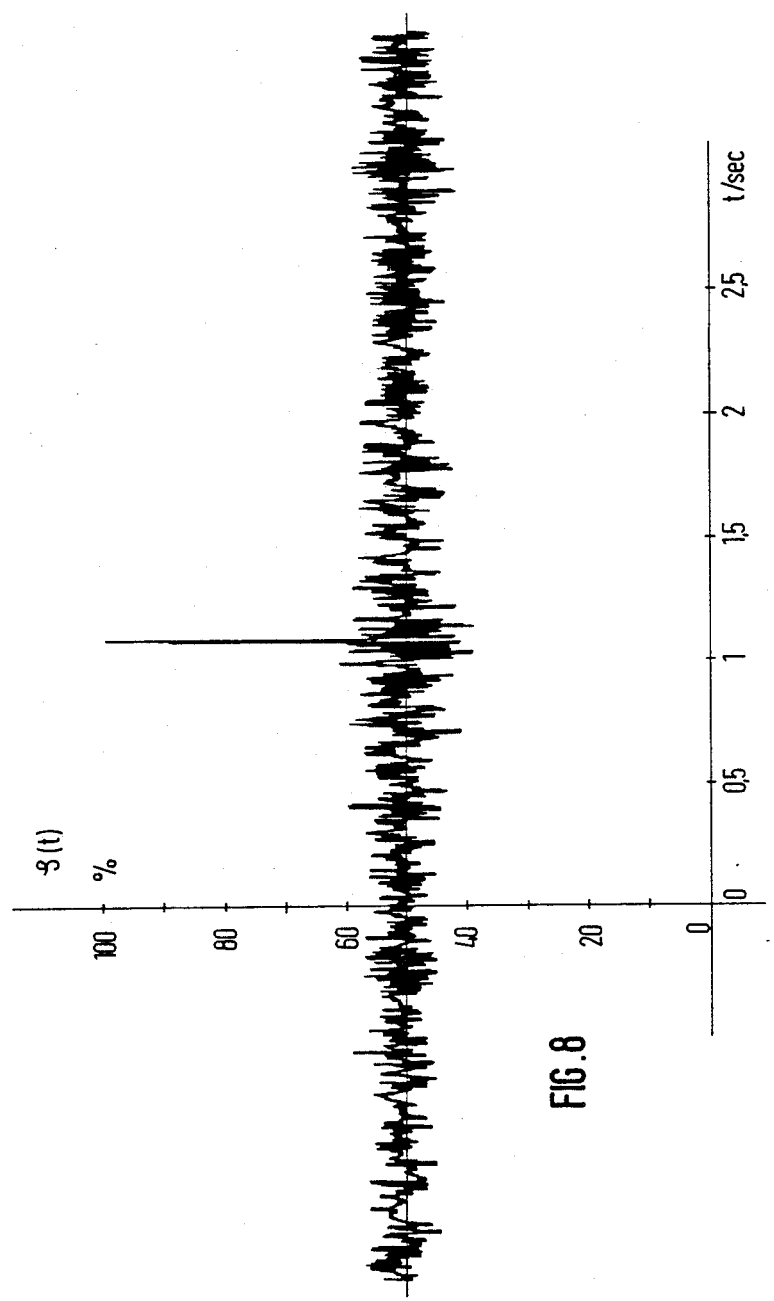

Measurements have shown that these envelope signals have a constant power density in the range of 0–3 Hz. This density then falls off at higher frequencies by about 26 dB/decade. The observed spectral curve can be closely approximated by the transmission function of a first-order low-pass filter. Naturally, there are a large number of curves of power density with respect to spectrum. For example, the power density for classical choral music is almost uniformly distributed and, thus, from a spectral standpoint is similar to white noise. FIG. 5 provides an example of the power density of the envelope of a pop music title. This curve is derived by averaging 32 FFT analyses representing a signal segment of about 15 seconds. One can see in FIG. 5 that there is a sudden drop in the spectrum above 50 Hz, which is due to the low-pass filter behind the envelope rectification operation. This restriction of the envelope spectrum apparently occurs at random. However, it includes the greater part of the envelope power and so far has not led to disadvantages in practical work. FIG. 5 also shows that the high-power spectral component is apparently due to the rhythm of a musical "single." In the example shown in FIG. 5 it is the base drum, which vibrates at a frequency of about 2 Hz. But no matter how the rhythm is generated, it is a periodical and hence redundant signal, and it leads to periodic autocorrelation function (ACF). FIG. 6 shows the ACF of the signal from FIG. 5. The periodicity caused by the rhythm is clearly visible. Although the point of greatest correlation, which results where there is identity with the reference signal, is distinctly visible, the periodic partial correlations are so large that misidentification is possible here. In FIG. 6 every secondary peak in the fine structure appears to be different from the others, so that the characteristics for the individual configuration of each reference signal (reference master or mask) must be sought in the signal components of the higher envelope frequency, which are present at lower power. Thus it can be seen that when special attention is given to the high envelope frequencies, the reference master truly becomes a unique entity, which then also affects the ACF. For this purpose, the envelope signal which is band-limited by the low-pass filter is differentiated, which amounts to a multiplication of the spectral function by j "omega." The spectral power density shown in FIG. 7 results from this manipulation, and a comparison with the figure clearly reveals the relationship. FIG. 8 shows the ACF belonging to the differentiated envelope signal. Here the periodicity has almost completely disappeared, and the area of high correlation (signal identity) has nearly shrunk to a single point in time. The advantage of this measure is the unmistakable reduction in partial correlation, which makes recognition unambiguous.

The relationships revealed by the four figures can also be replicated theoretically without a great deal of mathematics.

The spectrum from FIG. 5 is closely approximated by the equation $$A(f) = 1/(1 + j2\pi\tau f) \tag{1}$$

whereby τ corresponds to the time constant belonging to the 3 dB frequency. Now since the ACF is the Fourier transform of the power spectrum, the double exponential impulse $$AKF: \rho(t) = 2/(2\tau) \bullet exp\{-|t|/\tau\} \tag{2}$$

results after squaring and transforming into the time range.

Figure 9:
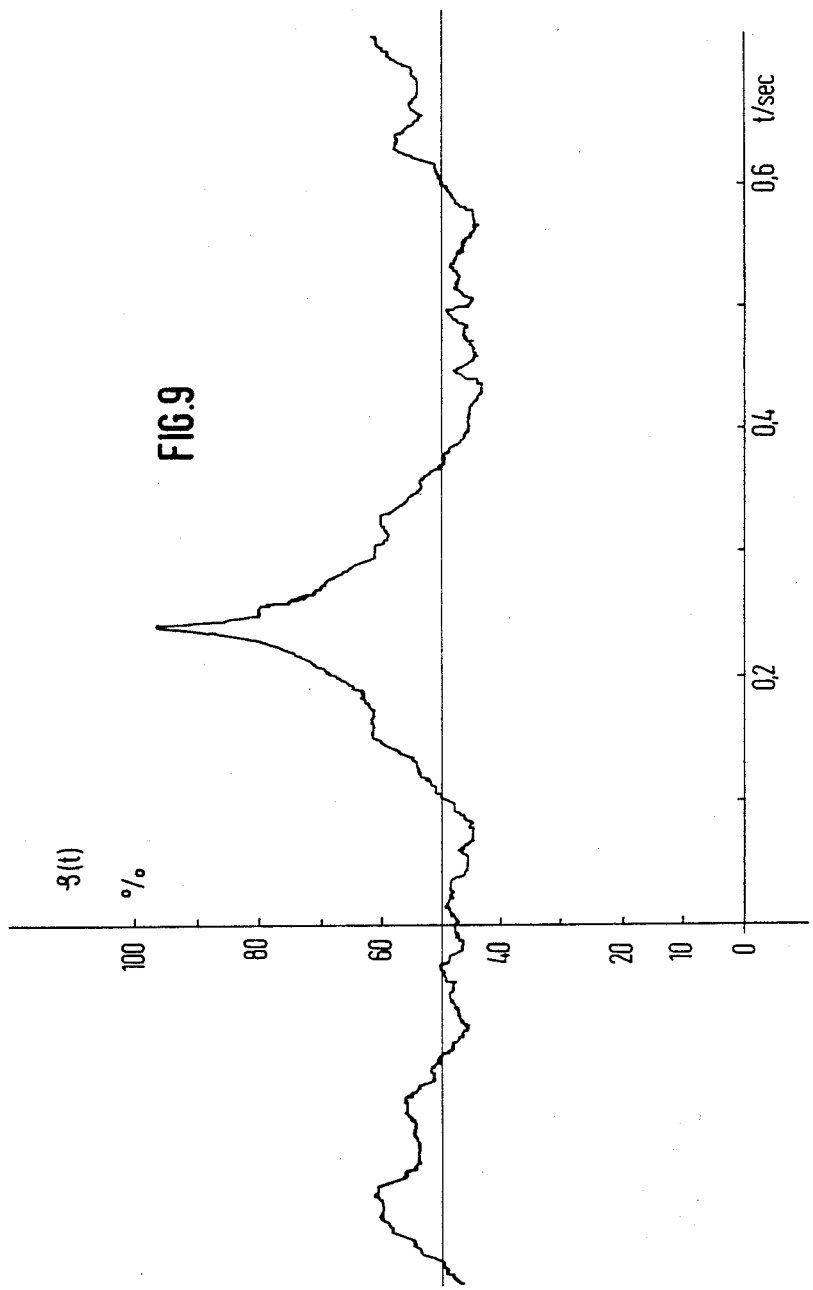

To also check this relationship quantitatively, the ACF of FIG. 6 is shown in FIG. 9 with an expanded abscissa, and a cutoff frequency of 4.4 Hz is determined by measuring the half-width value B of the clearly recognizable exponential impulse, which can be confirmed by the orders of magnitude shown in FIG. 6. Differentiating the envelope signal produces a spectral function, which can be described in close approximation by the equation $$A'(f) = \text{rect}\{f/(2f_g)\} \quad (3)$$

The Fourier transform then produces the ACF $$\rho(t) = \text{si}\{2\pi f_g t\} \quad (4)$$

Here, too, quantitative evaluation of the curve from FIG. 8, which is shown in expanded form in FIG. 10, results in a fully acceptable cutoff frequency of $f_g = 60$ Hz. (see FIG. 8).

Thus, it has been shown that the differentiation of the envelope signal, which has also been referred to as a "prewhitening" filter, results in better utilization of the information contained in the envelope. One disadvantage might be a higher sensitivity to distortion; however, there is no empirical information on this. But, even if this should be the case, "mild" differentiation, i.e., differentiation up to a frequency of about 30 Hz, is able to perceptibly increase the reliability of recognition.

Figure 11:
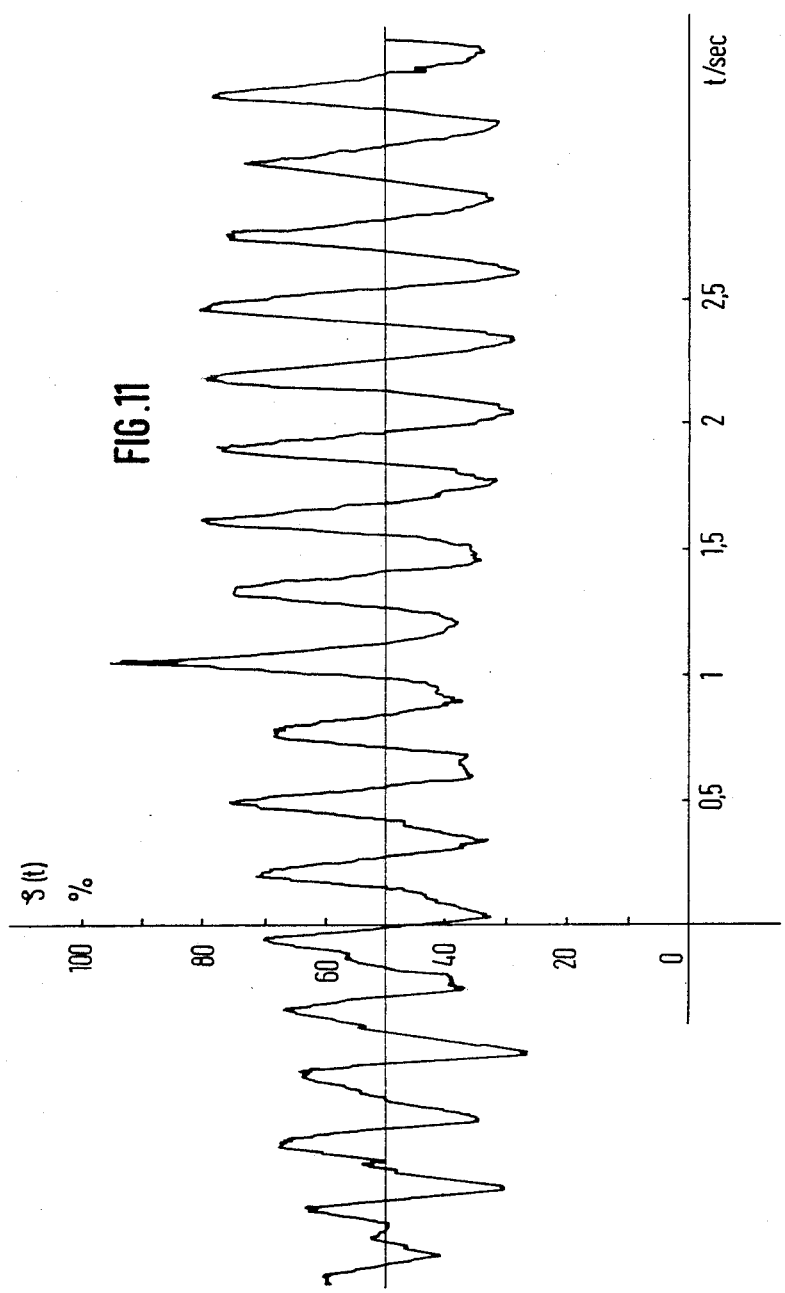
Figure 12:
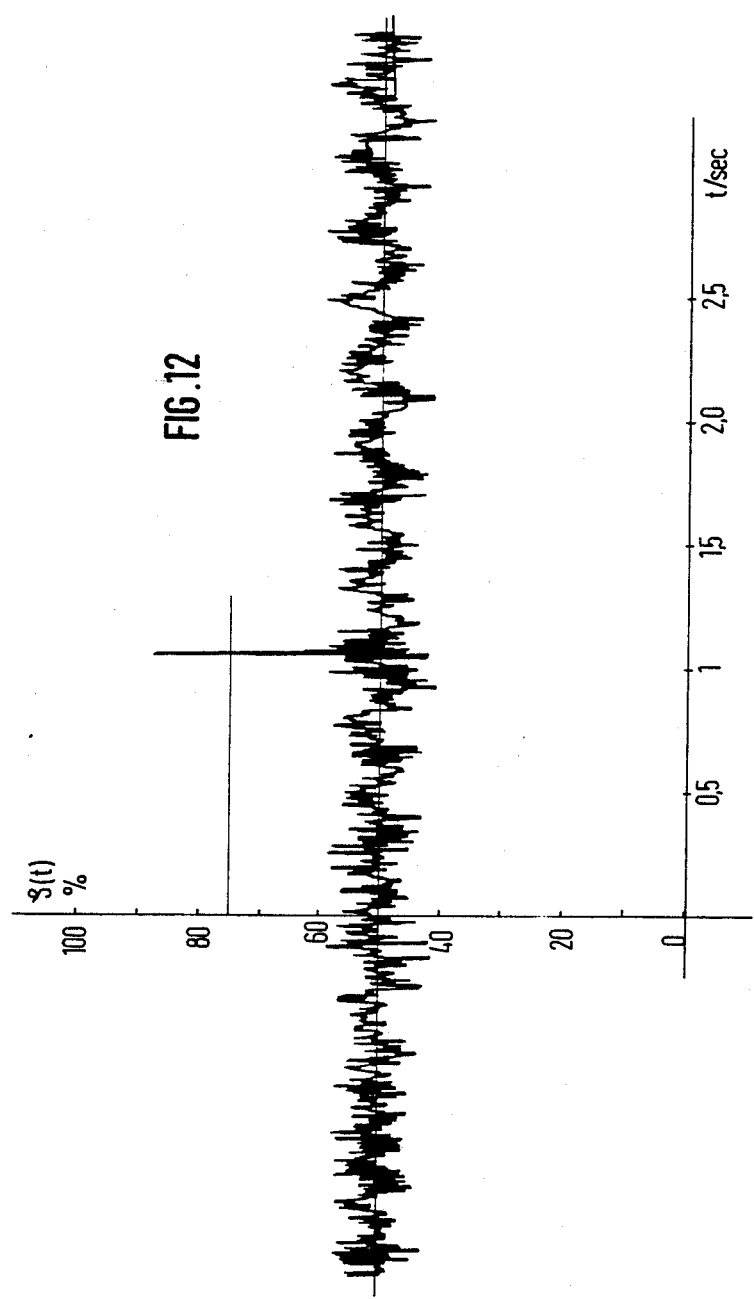
Figure 13:
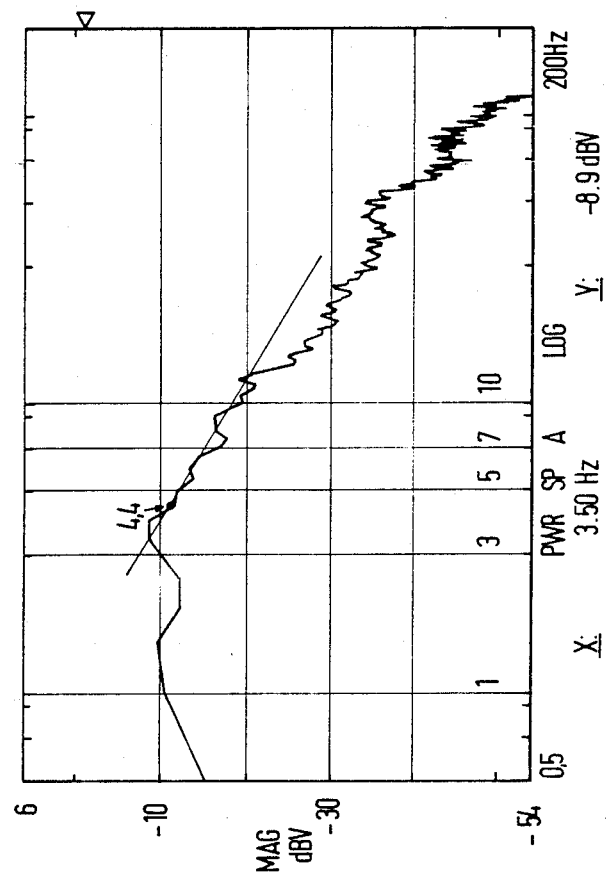

Once again, the advantage of differentiation will be shown using a "critical" pop title, in which, as the ACF in FIG. 11 shows, periodic recognition was encountered. Differentiation produced the ACF in FIG. 12, and here only the reference master was clearly recognized.

Figure 14:
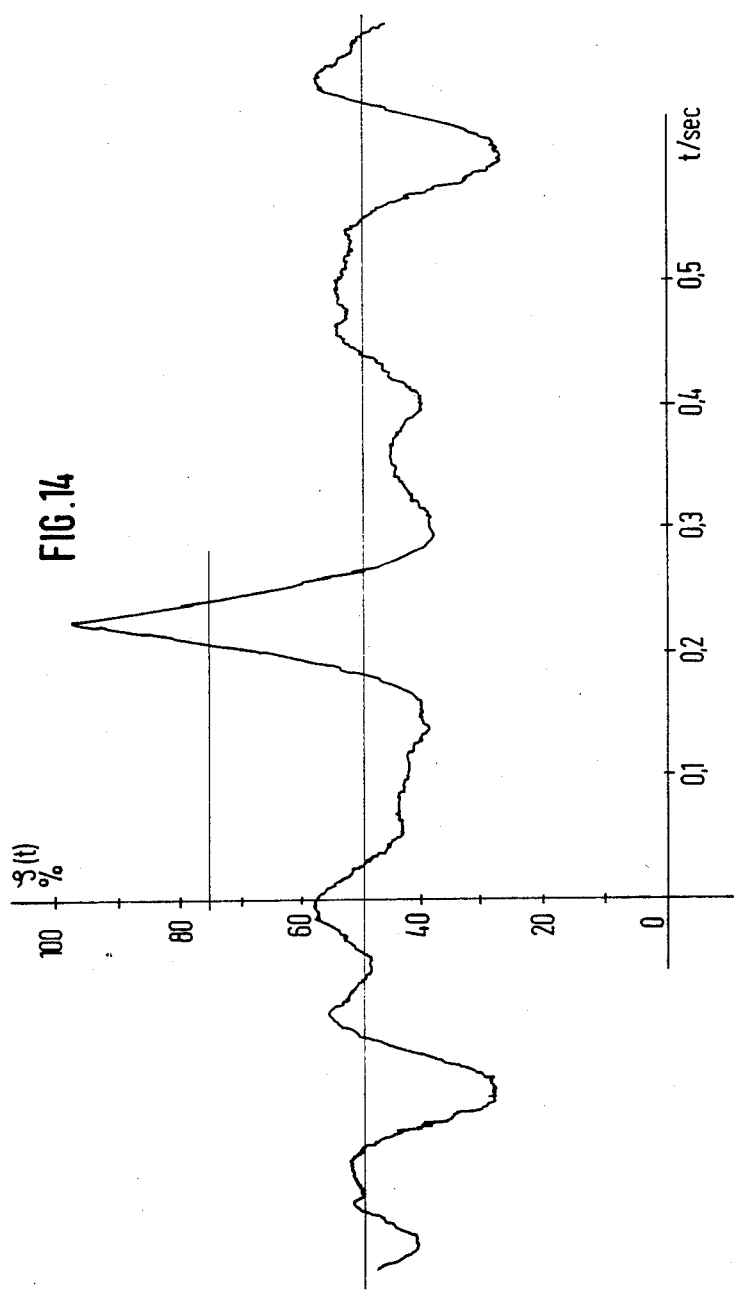
Figure 15:
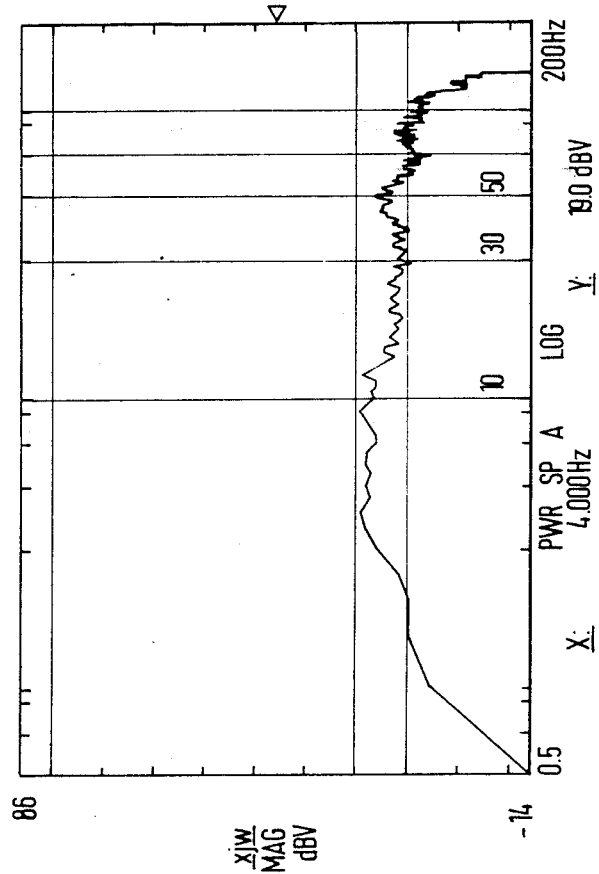

There are cases in which the gains due to differentiation are not large. An example of speech is offered to show this. FIGS. 13 through 16 show, in sequence, the undifferentiated envelope spectrum. FIG. 14 shows the associated ACF. FIG. 15 and FIG. 16 show the respective differentiated cases. Basically, the characteristics discussed above can be recognized: the correlation peak is narrower in the differentiated case; however, the partial correlations are still unchanged. However, there are no problems with recognition. It is difficult to model these relationships mathematically because of the complicated forms of distribution. According to available measurements, these latter figures appear to be typical of speech signals, in which the gains are less spectacular. So far, however, no difficulties have been encountered in recognizing speech signals.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A method for automatically recognizing a plurality of preset signal sequences in a broadcast signal comprising the steps of:
   generating one preset envelope signal from each of said plurality of preset signal sequences;
   differentiating each preset envelope signal to obtain differentiated preset envelope signals;
   transforming each differentiated preset envelope signal into digital, level-normalized, non-coded preset envelope signals by determining the signs of each differentiated envelope signal;
   storing preset time segments for each of said sign-coded, preset envelope signals;
   generating a broadcast envelope signal from said broadcast signal that is to be examined;
   differentiating said broadcast envelope signal;
   transforming said differentiated broadcast envelope signal into a digital, level-normalized, sign-coded broadcast envelope signal by determining the signs of said differentiated broadcast envelope signal;
   comparing time segments of the sign-coded broadcast envelope signal with the stored present time segments of the preset envelope signals of the present signal sequences; and
   when a preset degree of concordance is exceeded, generating a recognition signal.

2. A method according to claim 1 wherein all envelope signals are limited to a narrow low-frequency range (e.g., 2 Hz to 50 Hz).

3. A method according to claim 1 wherein said time segments of said sign-coded broadcast envelope signals are compared under clock control with the stored time segments from the preset signals, whereby, in the period of time between the arrival of the two consecutive time segments of said sign-coded broadcast envelope signals the earlier arriving time segment is compared with all the stored preset time segments of said sign-coded preset envelope signals.

4. A method according to claim 3 wherein the sign-coded broadcast envelope signals are stored temporarily at a scanning rate of approximately 300 Hz and the clock frequency of the comparison corresponds to a frequency which is formed from the product of the scanning rate times the number of preset signal sequences (music titles) times the number of bits stored per preset signal sequence.

5. A method according to claim 4 wherein said comparison clock frequency is equal to or greater than the formed product.

6. A method according to claim 4 wherein 512 bits are stored per preset signal sequence.

7. A method according to claim 1 wherein the comparison of the envelope signals is carried out as digital correlation and that a signal sequence to be examined is then defined as conforming to one of the stored signal sequences if the correlation produces a preset degree of concordance (e.g., 95%).

8. A method according to claim 1 wherein the preset signal sequences and the signal sequences to be examined are band-limited to a narrow frequency (e.g., 200 Hz to 4 HZ) before the envelopes are produced.

9. A circuit arrangement for automatically recognizing a plurality of preset signal sequences in a broadcast signal comprising:
   means for generating a plurality of preset envelope signals and broadcast envelope signals, said generating means comprising a rectifier circuit and a bandpass filter circuit;
   means for differentiating said preset envelope signals and said broadcast envelope signals to obtain differentiated preset envelope signals and differentiated broadcast envelope signals, respectively;
   means for transforming said differentiated preset envelope signals and said differentiated broadcast envelope signals into digital, level-normalized, sign-coded preset envelope signals and digital level-normalized, sign-coded broadcast envelope signals, respectively, by determining the sign of each differentiated signal;
   a first memory in which preset time segments of the sign-coded preset envelope signals of preset signal sequences are stored;

a second memory in which broadcast time segments of the sign-coded broadcast envelope signal of a signal sequence to be examined are stored;

a comparator which continually compares the particular contents of the second memory with the contents of the first memory and which, when a preset degree of concordance is exceeded, generates a recognition signal.

10. A circuit arrangement according to claim 9 further comprising a first bandpass filter having a narrow low-frequency range is connected downstream of the rectifier circuit.

11. A circuit arrangement according to claim 10 wherein said transforming means comprises an analog/digital converter connected downstream of the first bandpass filter.

12. A circuit arrangement according to claim 11 wherein the analog/digital converter comprises a comparator whose reference value is adjusted to a few mV to obtain said sign-coded signals from said differentiated signals.

13. A circuit arrangement according to claim 12 wherein the band-limited envelope signals from the first bandpass filter are written into the respective memories at a relatively low scanning rate (approximately 300 Hz) and the memories are coupled into the comparator at a clock frequency which is formed from the product of the scanning rate times the number of preset signal sequences times the number of bits stored in the first memory per preset signal sequence.

14. A circuit arrangement according to claim 13 wherein the memories are addressable random- access memories (RAM memories which are triggered by counting chains, the counting chains being triggered by a clock which generates two switch-selectable clock frequencies, one corresponding to the low scanning rate (approximately 300 Hz), while the other clock frequency is the clock frequency of the comparator.

15. A circuit arrangement according to claim 14 wherein the counting chain for the first memory monitors during the comparison whether the bits stored for the signal being monitored are read out and also whether all stored "masks" are read out and said counting chain is reset after read-out of all the masks stored in the memory and is interrupted or disabled for one counter pulse, so that the counting chain for the first memory, after each full run of all the masks, has at any given time a count difference of "1" compared to the counting chain for the second counter and that, during the counting pause for the counting chain for the first memory, a new scanning value for the signal being examined is read into the second memory.

16. A circuit arrangement according to claim 9 wherein the comparator is an exclusive OR-gate to which the particular data from the memories can be coupled serially.

17. A circuit arrangement according to claim 16 wherein a counter is connected downstream of the comparator, the counter being rerouted by "1" every time there is concordance between the bits to be compared.

18. A circuit arrangement according to claim 10 wherein a second bandpass filter is connected upstream of the pass band of the first bandpass located between approximated 200 Hz and 400 Hz.

19. A circuit arrangement for generating a plurality of preset signal sequences comprising:
    means for generating a plurality of preset envelope signals, said generating means comprising a rectifier circuit and a bandpass filter circuit;
    means for differentiating said preset envelope signals to obtain differentiated preset envelope signals;
    means for transforming said differentiated preset envelope signals into digital, level-normalized, sign-coded preset envelope signals by determining the sign of each differentiated signal; and
    a first memory in which preset time segments of the sign-coded preset envelope signals of preset signal sequences are stored.

20. A circuit arrangement for automatically recognizing a plurality of sign-coded preset signal sequences in a broadcast signal comprising:
    means for generating a plurality of broadcast envelope signals, said generating means comprising a rectifier circuit and a bandpass filter circuit;
    means for differentiating said broadcast envelope signals to obtain differentiated broadcast envelope signals, respectively;
    means for transforming said differentiated broadcast envelope signals into digital, level-normalized, sign-coded broadcast envelope signals, respectively, by determining the sign of each differentiated signal;
    a first memory in which preset time segments of the sign-coded preset envelope signals of preset signal sequences are stored;
    a second memory in which broadcast time segments of the sign-coded broadcast envelope signal of a signal sequence to be examined are stored; and
    a comparator which continually compares the particular contents of the second memory with the contents of the first memory and which, when a preset degree of concordance is exceeded, generates a recognition signal.

* * * * *